United States Patent
Kroes et al.

[11] Patent Number: 5,923,505
[45] Date of Patent: Jul. 13, 1999

[54] MAGNETORESISTIVE SENSOR HAVING A PINNED SOFT MAGNETIC LAYER

[75] Inventors: Derek Jan Kroes, Fremont; Marcos M. Lederman; Samuel W. Yuan, both of San Francisco, all of Calif.

[73] Assignee: Read-Rite Corporation, Milpitas, Calif.

[21] Appl. No.: 08/827,099

[22] Filed: Mar. 17, 1997

[51] Int. Cl.⁶ .................................................. G11B 5/39
[52] U.S. Cl. ............................................................ 360/113
[58] Field of Search .......................... 360/113; 338/32 R; 324/207.21

[56] References Cited

U.S. PATENT DOCUMENTS

| | | | |
|---|---|---|---|
| 5,452,163 | 9/1995 | Coffey et al. | 360/113 |
| 5,492,720 | 2/1996 | Gill et al. | 427/131 |
| 5,705,973 | 1/1998 | Yuan et al. | 360/113 X |
| 5,715,120 | 2/1998 | Gill | 360/113 |

FOREIGN PATENT DOCUMENTS 7-287819  10/1995  Japan.
8-036715   2/1996  Japan.

*Primary Examiner*—William J. Klimowicz
*Attorney, Agent, or Firm*—Nathan N. Kallman

[57] ABSTRACT

A magnetoresistive (MR) read sensor fabricated on a substrate comprises an MR layer of magnetoresistive material, a soft adjacent layer (SAL) of soft magnetic material, and a manganese-based metallic antiferromagnetic (AFM) layer between the MR layer and the SAL layer. The AFM layer is in direct contact with the SAL layer and is separated from the MR layer by a non-magnetic spacer layer. A non-magnetic texturing layer is disposed between the SAL layer and the substrate. This structure exhibits a much larger pinning field than read sensors using oxide-based antiferromagnets.

25 Claims, 2 Drawing Sheets

MAGNETORESISTIVE SENSOR HAVING A PINNED SOFT MAGNETIC LAYER

FIELD OF THE INVENTION

The present invention relates to magnetoresistive (MR) read sensors, and in particular to an entirely metallic MR read sensor and method of fabrication.

BACKGROUND OF THE INVENTION

Magnetoresistive (MR) read sensors are used in magnetic disk and tape systems to read signals in the form of changes in magnetic flux. Generally, MR read sensors are fabricated as multi-layered structures in which thin film layers are deposited on a substrate. U.S. Pat. No. 5,508,866 to Gill, et al. discloses such an MR sensor having a nickel oxide material that is antiferromagnetic and is an electrical insulator, the material being placed between a substrate and a soft adjacent layer (SAL). The prior art patented structure is shown in FIG. 1. The MR sensor comprises an antiferromagnetic (AFM) stabilization layer (101) of nickel oxide (NiO), a transverse bias layer (102) of nickel-iron-niobium (NiFeNb) called a soft adjacent layer (SAL), a spacer layer (103) of tantalum (Ta), and an MR layer (105) of nickel iron (NiFe) deposited on a suitable substrate (111). A longitudinal bias layer (107) of nickel manganese (NiMn) is deposited over a seed layer (104) of NiFe in the passive end or tail regions (106) of the sensor to provide a longitudinal bias field in the MR layer (105) by exchange coupling between the NiMn and the NiFe layers. Conductive leads (109) of a suitable low resistivity material are formed in the end regions over the longitudinal bias layer to provide electrical connection between the MR sensor and external circuitry. The conductive lead (109) is a layered structure including a primary conductor of gold (Au) with an overlayer and underlayer of Ta. Additionally, the MR layer (105) is capped with a thin capping layer (113) of Ta in the sensor's active region. The electrical lead connectors connect the MR sensor to a signal sensing circuit (114) and a bias current source (116).

While oxide-based antiferromagnetic materials result in improved corrosion properties, an oxide based pinned SAL has a small pinning field.

It is therefore desirable to provide an improved MR read sensor having a pinning field that is much larger than the pinning field achieved by MR heads with an oxide based antiferromagnet.

It is also desirable to provide a method for fabricating an improved MR read sensor having a pinning field that is much larger than the pinning field achieved by MR heads with an oxide antiferromagnet.

SUMMARY OF THE INVENTION

According to this invention, a read sensor comprises a layer of magnetoresistive material and a layer of soft magnetic material, with a metallic antiferromagnetic layer between the layer of magnetoresistive material and the layer of soft magnetic material. The metallic antiferromagnetic layer is in direct contact with the layer of soft magnetic material and separated from the layer of magnetoresistive material by a non-magnetic metallic spacer layer. The read sensor is fabricated on a substrate, and a non-magnetic texturing layer is placed between the layer of soft magnetic material and the substrate.

An advantage of an all metallic MR read sensor in this architecture is improved pinning without current shunting.

The invention has the advantage that the pinning field is much larger than the pinning field achieved by MR heads with a nonmetallic oxide antiferromagnet.

DESCRIPTION OF THE PREFERRED EMBODIMENT

Figure 1:
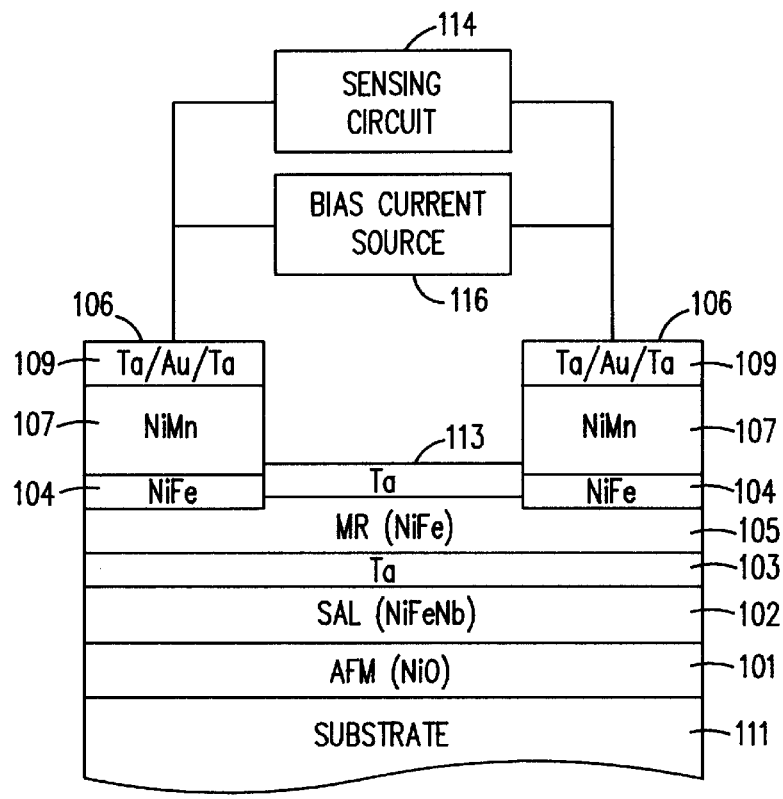
FIG. 1 is a diagrammatic representation of the structure of a prior art MR read sensor.
Figure 2:
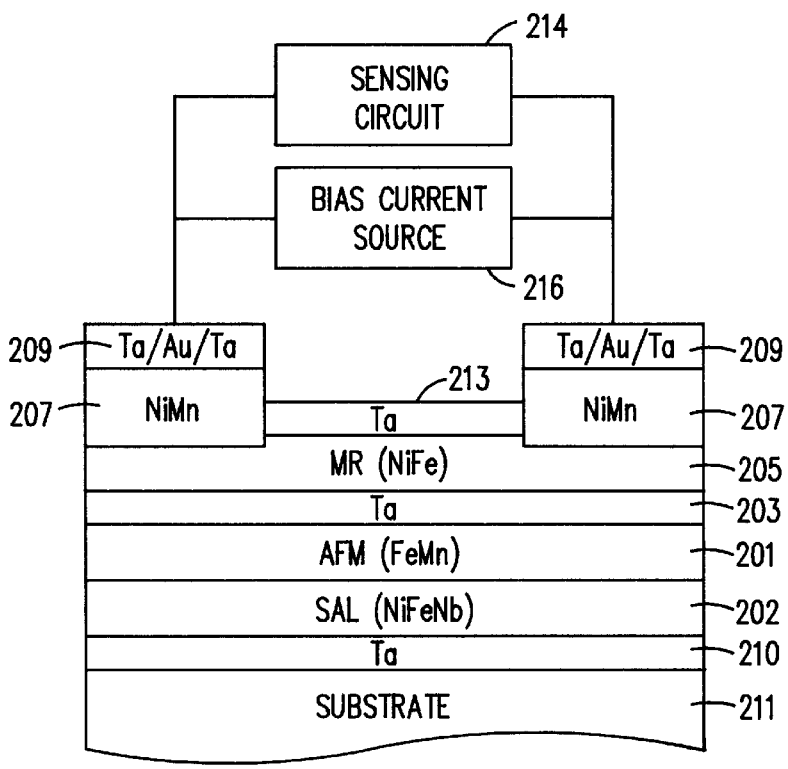
FIG. 2 is a diagrammatic representation of the structure of an MR read sensor embodying the present invention.

With reference to FIG. 2, an MR read sensor comprises a central active region and two passive end regions (207–209). The MR sensor is fabricated using known techniques, for example, RF (radio frequency) or DC (direct current) sputtering. A substrate (211) is prepared as known in the prior art, including a layer of insulating material such as alumina. In accordance with the teachings of the present invention, a sensor active region structure is formed of layers of Ta/NiFeNb/FeMn/Ta/NiFe/Ta which are deposited sequentially. Next, the sensor end regions are defined by photolithography and by ion milling or etching subtractively to remove the thin Ta cap layer (213) to expose the NiFe MR layer 205 at the end regions. The longitudinal bias layer (207) is deposited in the sensor end regions making contact with the MR layer (205). Conductor leads (209) of Ta/Au/Ta are deposited on the longitudinal bias layer (207). The electrical lead connectors 209 connect the MR sensor to a signal sensing circuit (214) and a bias current source (216).

The shape in the central active region is defined by a second photolithographic patterning process followed by a subtractive removal process. The central active region of the sensor is bounded by the longitudinal bias and lead layers (207, 209).

Figure 3:
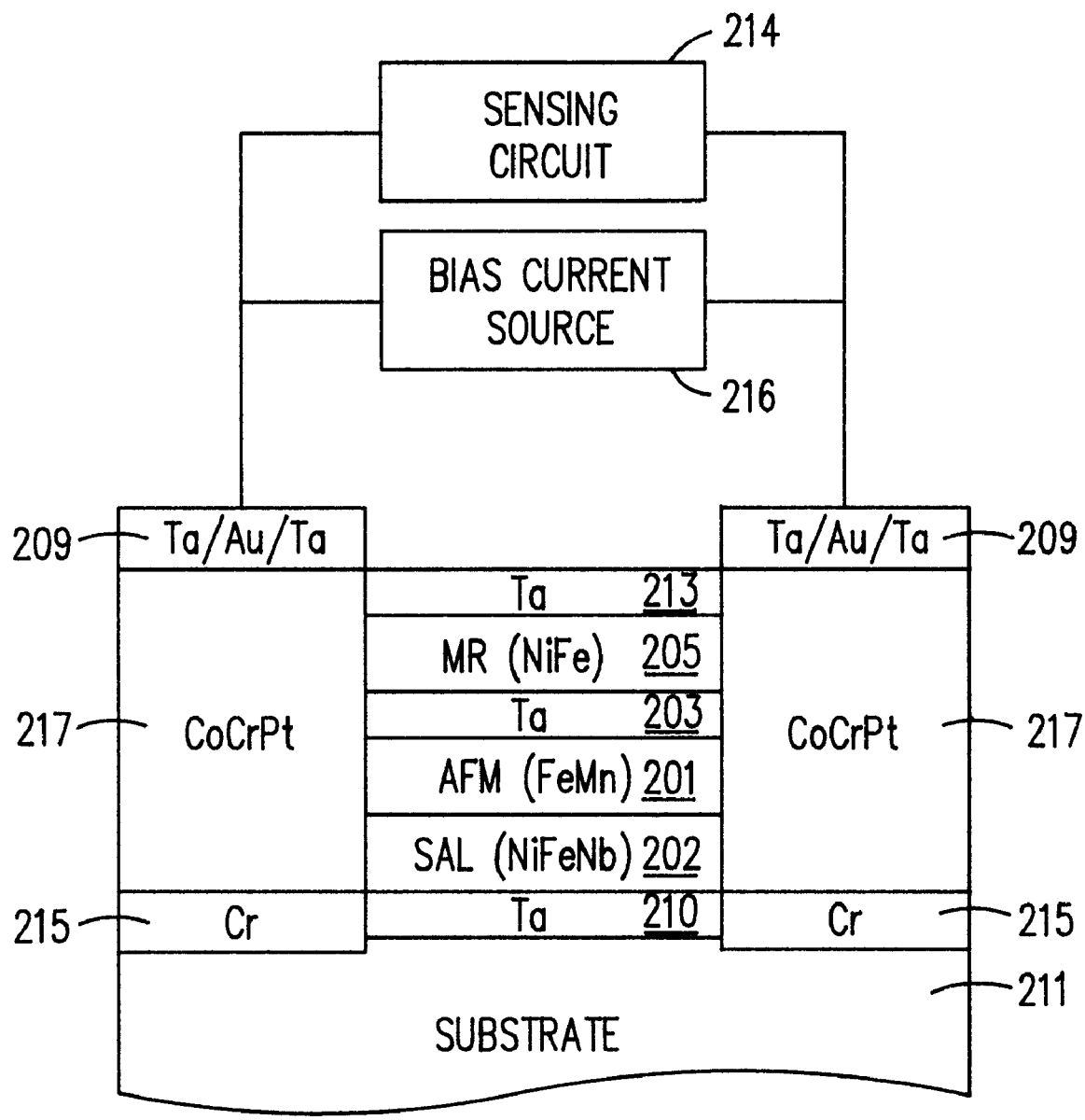
FIG. 3 is a diagrammatic representation of an alternative structure of an MR read sensor, according to this invention.

In the alternative embodiment of FIG. 3, the NiMn layer 207 is replaced by a Cr layer (215), which extends slightly into the substrate (211) and to the top level of the Ta layer (213); and a COCrPt layer (217) that is formed on top of the Cr layer (215) and below the conductor leads (209) of Ta/Au/Ta. Layers (215) and (217) provide an abutted hard bias magnet structure. The MR read sensor of FIG. 3 is simpler and easier to manufacture.

In a preferred embodiment of the invention, the NiFeRh or NiFeNb soft adjacent layer (202) is about 75–150 Å thick. The AFM stabilization layer (201) and Ta spacer layer (203) together are about 75–150 Å thick, resulting in a pinning field of about 100 Oersteds, which is much larger than that obtained with an oxide based antiferromagnet.

The NiFe MR layer (205) is about 150 Å thick and the Ta capping layer (213) is about 30 Å thick. The NiMn longitudinal bias layer (207) is about 350 Å thick and the conductive lead structure is about 350 Å thick. The Ta texturing layer (210) between the substrate (211) and the SAL (202) is about 30 Å thick.

The method for fabricating the active region (200) of the read sensor is as follows. A suitable substrate (211) is prepared for thin film deposition. A non-magnetic texturing layer (210) of tantalum is deposited to a thickness of about 30 Å on the substrate. A layer of soft magnetic material (202) is deposited to a thickness of about 150 Å on the non-magnetic texturing layer. A metallic AFM layer (201) consisting essentially of a manganese based metal alloy, such as FeMn, IMn, is deposited to a thickness of about 100 Å on the layer of soft magnetic material. A non-magnetic spacer layer (203) is deposited on the AFM layer, and a layer of MR material (205) is deposited on the non-magnetic spacer layer. Finally a capping layer (213) and leads (209) are fabricated by known prior art techniques. Typical resistivities of the Mn based AFM material are in the range of 100–200 micro-ohms×centimeter. Therefore the resultant structure of this invention would have a resistivity very close to a typical MR structure formed with a soft magnetic active layer.

While the invention has been particularly shown and described with reference to preferred embodiments thereof, it will be understood by those skilled in the art that the foregoing and other changes in form and detail may be made therein without departing from the scope of the invention.

What is claimed is:

1. A read sensor comprising:

a layer of magnetoresistive material;

a layer of soft magnetic material; and, a metallic antiferromagnetic layer between said layer of magnetoresistive material and said layer of soft magnetic material;

said metallic antiferromagnetic layer being in direct contact with said layer of soft magnetic material;

a non-magnetic spacer layer separating said layer of magnetoresistive material from said antiferromagnetic layer; and means for providing longitudinal bias disposed in contact with said layer of magnetoresistive material;

wherein the combined thickness of said antiferromagnetic layer and said spacer layer is in the range of 75–150 Angstroms.

2. The read sensor of claim 1 further comprising:

a substrate: and a non-magnetic texturing layer between said layer of soft magnetic material and said substrate.

3. The read sensor of claim 2 wherein said non-magnetic texturing layer comprises tantalum.

4. The read sensor of claim 2 wherein said non-magnetic texturing layer is about 30 Å thick.

5. The read sensor of claim 1 wherein said metallic antiferromagnetic layer comprises a material consisting of a manganese based metal alloy.

6. The read sensor of claim 1 wherein said metallic antiferromagnetic layer comprises a material selected from the group consisting of iron-manganese and iridium-manganese.

7. The read sensor of claim 1 wherein said metallic antiferromagnetic layer and said spacer layer have a total thickness of about 100 Å.

8. The read sensor of claim 1 wherein said layer of soft magnetic material is about 150 Å thick.

9. The read sensor of claim 1 wherein said means for providing longitudinal bias comprises a layer of NiMn.

10. The read sensor of claim 9 wherein said layer of NiMn is about 350 Å thick.

11. The read sensor of claim 1, wherein said means for providing longitudinal bias comprises abutted hard bias material.

12. The read sensor of claim 11, wherein said hard bias material is formed of a layer of chromium and a layer of CoCrPt disposed over said chromium layer, said chromium and CoCrPt layers being in contact with the ends of said layer of magnetoresistive material, said spacer layer, said antiferromagnetic layer and said layer of soft magnetic material.

13. A magnetic storage system including a magnetic storage medium for processing data comprising:

a magnetic transducer having an active region;

said active region including a magnetoresistive layer;

said active region including a soft adjacent layer of ferromagnetic material, said soft adjacent layer providing a transverse bias magnetic field to said magnetoresistive layer;

said active region including a metallic antiferromagnetic layer of antiferromagnetic material between said magnetoresistive layer and said soft adjacent layer, said antiferromagnetic layer being in direct contact with said soft adjacent layer;

a non-magnetic spacer layer separating said magnetoresistive layer from said antiferromagnetic layer; and sensing means coupled to said active region for detecting resistance changes in said magnetoresistive layer responsive to magnetic fields representative of data bits recorded in said magnetic storage medium;

wherein the combined thickness of said antiferromagnetic layer and said spacer layer is in the range of 75–150 Angstroms.

14. The magnetic storage system of claim 13 wherein said active region further includes:

a non-magnetic texturing layer between said soft adjacent layer and a substrate.

15. The magnetic storage system of claim 14 wherein said nonmagnetic texturing layer is comprised of tantalum.

16. The magnetic storage system of claim 14 wherein said nonmagnetic texturing layer is about 30 Å thick.

17. The magnetic storage system of claim 14 wherein said soft adjacent layer is about 150 Å thick.

18. The magnetic storage system of claim 13 wherein said metallic antiferromagnetic layer comprises a material consisting of a manganese based metal alloy.

19. The magnetic storage system of claim 13 wherein said metallic antiferromagnetic layer comprises a material selected from the group consisting of iron-manganese and iridium-manganese.

20. A method of fabricating an active region of a read sensor comprising the steps of:

depositing a non-magnetic texturing layer on a substrate;

depositing a layer of soft magnetic material on said nonmagnetic texturing layer;

depositing a metallic antiferromagnetic layer on said layer of soft magnetic material;

depositing a non-magnetic spacer layer on said antiferromagnetic layer; and, depositing a layer of magnetoresistive material on said nonmagnetic spacer layer;

wherein the combined thickness of said antiferromagnetic layer and said spacer layer is in the range of 75–150 Angstroms.

21. The method of claim 20 wherein said metallic antiferromagnetic layer comprises a material consisting of a manganese based metal alloy.

22. The method of claim 20 wherein said metallic antiferromagnetic layer comprises a material selected from the group consisting of iron-manganese and iridium-manganese.

23. The method of claim 20 wherein said non-magnetic texturing layer comprises tantalum.

24. The method of claim 20 wherein said non-magnetic texturing layer is about 30 Å thick.

25. The method of claim 20 wherein said layer of soft magnetic material is about 150 Å thick.

* * * * *